June 5, 1951        H. V. BOWMAN        2,555,313
DIEMAKING MACHINE
Filed May 5, 1948        6 Sheets-Sheet 1

FIG. 1

INVENTOR
HENRY V. BOWMAN
By Paul, Paul & Moore
ATTORNEYS

June 5, 1951  H. V. BOWMAN  2,555,313
DIEMAKING MACHINE

Filed May 5, 1948  6 Sheets-Sheet 5

INVENTOR.
HENRY V. BOWMAN
BY
Paul, Paul & Moore
ATTORNEYS

INVENTOR.
HENRY V. BOWMAN
BY
ATTORNEYS

Patented June 5, 1951

2,555,313

UNITED STATES PATENT OFFICE 2,555,313

DIEMAKING MACHINE

Henry V. Bowman, Minneapolis, Minn.

Application May 5, 1948, Serial No. 25,151

7 Claims. (Cl. 76—4)

This invention is directed to an improved apparatus for making dies, and more particularly metal stamping dies of the relatively larger sizes which may be extremely difficult to handle in accordance with present day methods, and by the use of which the operation of completing a die may be greatly expedited with less likelihood of error, and with the assurance that the two parts of the die will accurately interfit with one another when the job is completed.

Dies play a very important part in the manufacturing industry as a means for expediting shop operations and reducing labor costs. Each die is usually made for a given job, and they are therefore made by hand which may greatly increase the initial cost of producing a certain piece of equipment. However, when the necessary dies and tools have been completed for turning out such a piece of equipment, the cost of making the article is greatly expedited, and with the assurance all articles of a given type will be identical in construction.

To make a set of dies on a conventional work bench is a tedious job and may consume a great many hours of labor, particularly if the die is a large one, whereby the parts of the die may be rather difficult for a single mechanic to handle, and it is, therefore, frequently necessary that two or more mechanics be at hand to handle the parts of the die when they are to be turned over on the work bench to facilitate working thereon.

Various types of apparatuses have heretofore been provided to facilitate the handling of large dies, such as specially designed tables or benches having different forms of lifting devices associated therewith, whereby the parts of a large die may more readily be moved about on the table or bench to facilitate interfitting the parts to one another. With such equipment, it is necessary that the parts of the die be placed upon the work bench or table and then periodically turned over whereby the portion of the die to be operated upon will be so positioned with respect to the mechanic or workman that he may conveniently perform the necessary operations thereon. Large dies are frequently extremely awkward to handle with present day equipment because of their weight, and because the parts of the dies may have to be fitted together several times before the composite die can be completed.

It is, therefore, highly desirable that some means be provided for supporting the usual punch holder and die shoe to which the usual parts of a die may be secured independently of one another, and whereby each die part may be conveniently worked upon by a mechanic, and also whereby the punch holder and die shoe may be moved into or out of interfitting engagement with one another and with precision accuracy, and whereby the parts of the die set secured thereto may be similarly brought into interfitting engagement with one another for inspection purposes during the final operations of completing the die, all of said work being readily accomplished without requiring any heavy lifting or shifting of detachable parts by the mechanic, thereby reducing to a minimum the danger of injuring fingers, and the like, as when it is necessary to frequently manually shift the parts of a die during the construction thereof.

The novel apparatus herein disclosed comprises means for supporting the die shoe of a die-set in a predetermined position upon a suitable bed plate, and means for adjustably supporting the usual punch holder relative to the die shoe, whereby the punch holder may be conveniently moved into and out of engagement with the die shoe with the assurance that each time the punch holder is this moved out of engagement with the die shoe to expose the punch and die, for the purpose of performing work operations thereon, when necessary, or for inspection purposes, the punch holder may readily and quickly be returned to its position in engagement with the die shoe, with the assurance the die parts secured respectively to the punch holder and die shoe will be accurately related to one another. The punch holder is also mounted for rotation about a horizontal axis whereby the die or die part secured thereto may be turned over into full view of the mechanic to permit him to readily and conveniently perform work operations thereon, when necessary, or to inspect the interfitting of the die parts.

An important object of the invention, therefore, is to provide a die making machine which readily lends itself for use in the construction of all types and sizes of dies. Briefly, it comprises means for independently supporting each part of the die-set, and whereby said parts may readily be shifted with respect to one another to bring them into proper engagement with one another, and, in addition, means is provided in the upper portion of the apparatus for movably supporting a suitable drill head whereby required holes may be conveniently and accurately drilled in the die parts without removing them from the apparatus.

A further object is to provide an apparatus adapted for handling both large and small dies, and more particularly the larger sets, whereby substantially all of the work which must be accurately done to assure the proper fit between the die parts, may be performed while the die parts are supported in the apparatus, means also being provided whereby the two die parts may be conveniently brought into and out of engagement with one another at intervals during the machining thereof to determine if work operations on the parts have been accurately performed by the mechanic, and also whereby the mechanic may be assured that the die parts, when completed, will accurately produce the parts to be made thereby.

Another important object of the invention is to provide a movable support for the usual punch holder which is so constructed as to engage only the ends of the punch holder, whereby substantially the entire back side of the punch holder is exposed to permit the drilling of additional holes into the punch holder for bolts, dowels, etc., without removing the punch holder from the machine.

Another object resides in the mounting of the die shoe whereby it is spaced upwardly from the bed plate to thereby expose the major portion of the bottom of the die shoe to permit bolts, and the like, to be mounted therethrough from the bottom, and also whereby an electric light bulb may be placed on the bed plate directly under the die shoe so that its rays may be directed upwardly through holes in the die shoe, and perhaps through holes in a die secured thereto, to thereby facilitate the inspection of fits between the die parts.

Other objects of the invention reside in the construction of the apparatus whereby the punch holder may be quickly raised or lowered by power under finger-tip control, and also whereby the punch holder may be rotated about a horizontal axis by the simple manipulation of a conveniently located hand wheel, thereby to position the punch holder whereby a mechanic may readily perform work operations on the die part secured thereto, and also whereby the die part may be conveniently inspected at will; in the provision of a power-operated drill head movably mounted over the bed plate in such a manner that it may quickly and conveniently be brought into position to drill additional holes in the die parts for screws, bolts or dowels, at any time without removing the die parts from the apparatus, and whereby the operation of constructing a die may be greatly expedited, as the parts of the die need not be removed from the die making machine for the purpose of drilling additional holes therein, as is now customary; in the provision of an apparatus of this general type which makes it possible for a single mechanic to complete the parts of a relatively large die without requiring the assistance of others to move the parts of the die about from place to place, whereby the time required to construct and complete a die may be greatly reduced with a corresponding decrease in the cost of producing the die; and in the arrangement of the angle brackets provided on the columns whereby the punch holder may be rotated about a horizontal axis at any time to facilitate inspection, and whereby work operations may be more readily performed on the die, and also whereby the punch holder may readily and quickly be brought into alignment with the die shoe to facilitate periodic interfitting of the die parts for the purpose of checking work operations, etc.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

Figure 1:
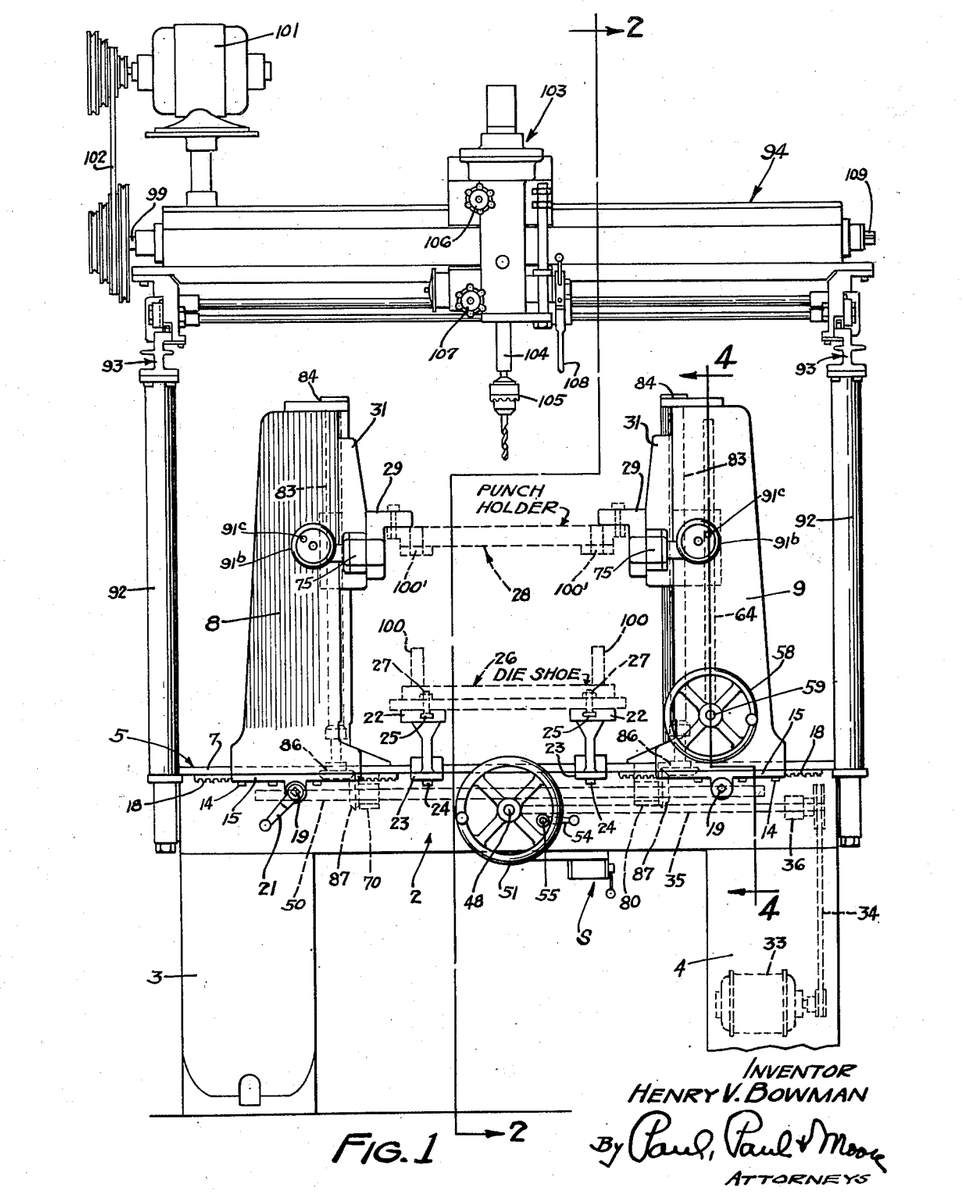
Figure 1 is a front elevational view of the die making machine herein disclosed, indicating in dotted lines the positions of the usual punch holder and die shoe, and also showing the arrangement of the drill head over the bed plate.
Figure 2:
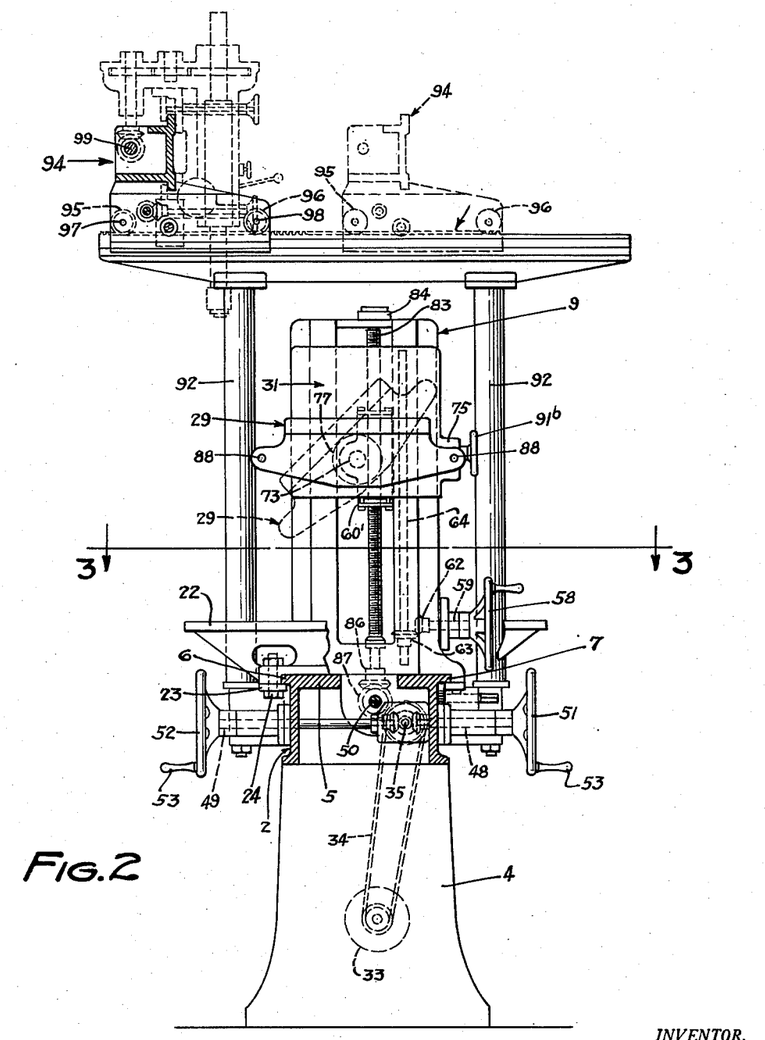
Figure 2 is a sectional elevation substantially on the line 2—2 of Figure 1, more clearly illustrating the supporting means for the drill head.
Figures 4, 10:
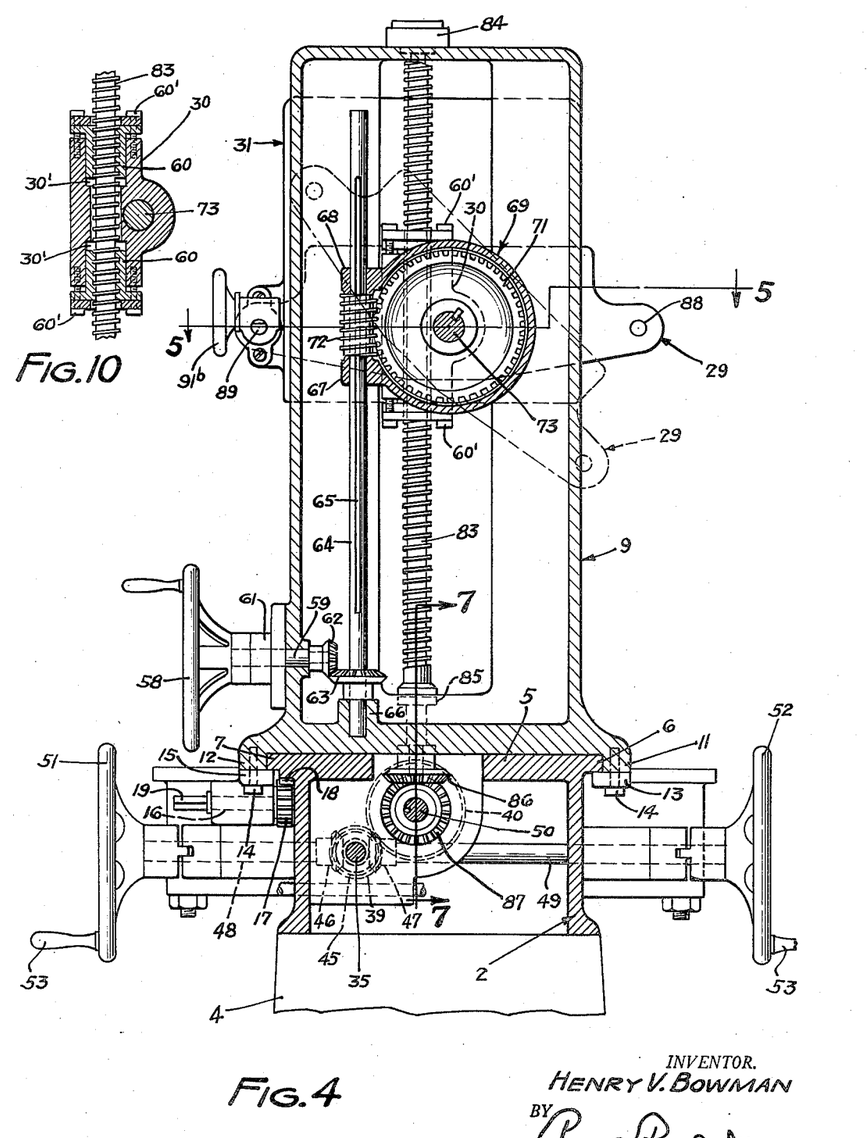
Figure 4 is an enlarged detail sectional elevation substantially on the line 4—4 of Figure 1, showing the operating means for varying the position of the angle brackets.
Figure 10 is a detail sectional view showing the means provided for taking up wear and end play in the screw shafts which raise and lower the angle brackets for supporting the die shoe.

The novel apparatus herein disclosed is shown comprising a bed plate 2 secured to the upper ends of suitable standards 3 and 4, as shown in Figure 1. The bed plate 2 comprises a top portion 5 provided at opposite sides with outwardly projecting flanges 6 and 7, as best illustrated in Figures 2 and 4. Columns 8 and 9 are mounted for relative sliding movement on the bed plate 2 in a direction lengthwise thereof, and whereby the spacing between the columns may be varied to adapt the machine for dies of various lengths.

Each column, as best illustrated in Figure 4, is shown provided with depending flange-like portions 11 and 12 which slidably fit the opposed edges of the projecting flanges 6 and 7. A plate element 13 is secured to the rear portion 11 of each column by suitable bolts 14, and a bracket 15 is secured to the bottom face of the front portion 12 of each column by similar bolts 14. The above described parts cooperate to provide guideways for guiding the columns 8 and 9 in their movements on the bed plate 2.

Each bracket 15 has a shaft 16 rotatably mounted therein which have pinions 17 secured to their inner ends adapted to roll in rack bars 18 secured to the bottom face of the flange 7 of the bed plate 2, as will be understood by reference to Figure 4. The shafts 16 have projecting end portions 19 which are squared to receive a suitable crank 21, whereby the shafts 16 may be conveniently selectively rotated to horizontally translate the columns 8 and 9 upon the bed plate, relative to one another. Note particularly Figure 1.

An important feature of the present invention resides in the means provided for supporting the die shoe 26, indicated in dotted lines in Figure 1, whereby the die shoe is spaced upwardly from the bed plate to provide access therebeneath for the insertion of bolts, screws, and the like, and also whereby an electric light bulb may be placed under the die plate to illuminate the bottom thereof and to facilitate inspection of the parts.

To thus support the die shoe 26 upon the bed plate 2, a pair of parallel bars 22 having portions overhanging the flanges 6 and 7 of the bed plate are placed upon the bed plate, as shown in Figure 2. The parallel bars 22 are provided with suitable clamping elements and bolts 23 and 24, respectively, whereby the parallel bars 22 may be secured to the table top 5 at selected locations along the length thereof, between the columns 8 and 9, as will be understood by reference to Figure 1. The parallel bars 22 are shown provided with the usual T slots 25 for receiving the heads of clamping bolts utilized for securing the work or die shoe to the parallel bars, as is well known in the art.

In Figure 1 the die shoe 26 is shown adjustably secured to the parallel bars 22 by bolts 27 having their heads received in the T slot 25 of the parallel bars. By thus supporting the die shoe, the latter may readily be shifted about relative to the bed plate 2 to properly position it with respect to its complemental punch holder 28, indicated in dotted lines in Figure 1.

Another important feature of the present invention resides in the means provided for adjustably supporting the punch holder 28 above the parallel bars 22 whereby it may readily be moved towards or away from a die shoe positioned upon the parallel bars, and also whereby the punch holder may readily and conveniently be rotated about a horizontal axis to bring its face into the most desired position for the mechanic.

Figures 5, 6, 7:
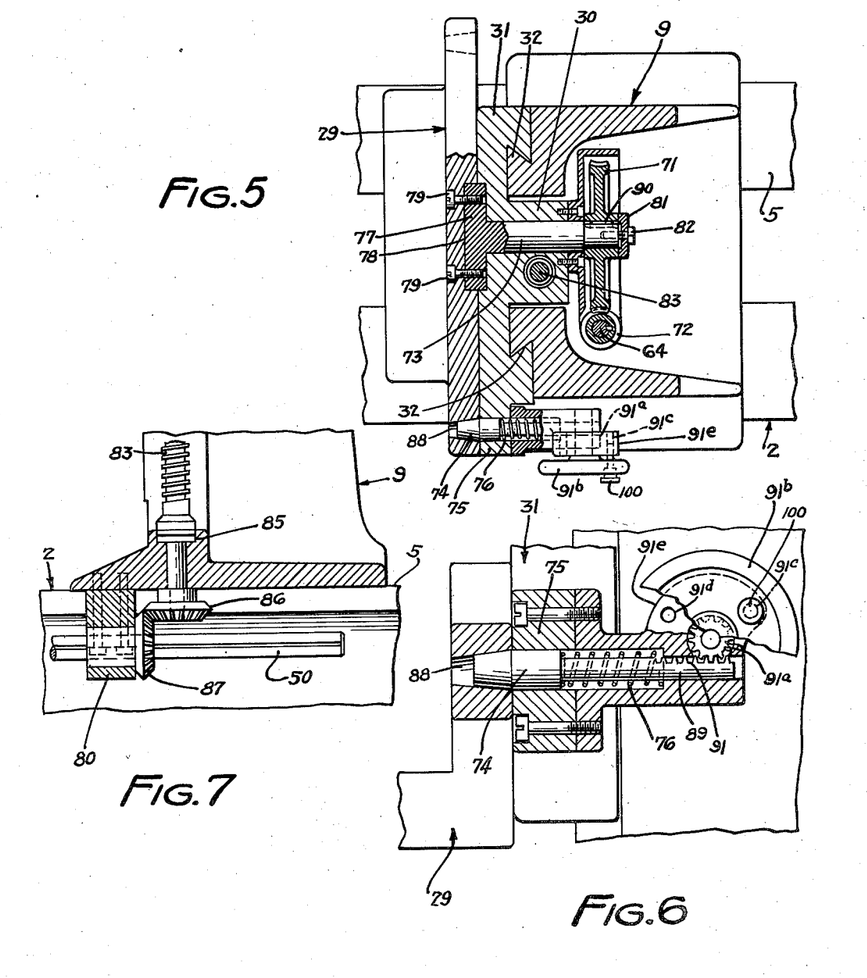
Figure 5 is a sectional detail view on the line 5—5 of Figure 4, showing the means for locking the carriages in adjusted position.
Figure 6 is an enlarged fragmentary detail sectional view substantially on the line 6—6 of Figure 3, showing the operating means for the carriage locks.
Figure 7 is a fragmentary detail sectional view on the line 7—7 of Figure 4, showing the driving connection between the upright screw shafts in each column and the shaft for transmitting power thereto.

To thus movably support the punch holder 28, a pair of opposed angle brackets, generally designated by the numeral 29, are shown carried by suitable carriages 31 mounted for vertical travelling movement in suitable guides 32 provided on the columns 8 and 9, as clearly illustrated in Figures 1 and 5. The carriages 31 are adapted to be simultaneously vertically translated in their guideways 32 by a suitable motor 33, indicated in dotted lines in Figure 1. The motor has a belt drive 34 drivingly connecting it to a drive shaft 35, one end of which is mounted in a bearing indicated at 36 in Figure 1, and its opposite end being mounted in a suitable bearing 37 provided in a housing 38, as best illustrated in Figure 8.

A pinion 39 is loosely mounted upon the shaft 35 between suitable clutch members 41 and 42, the clutch member 41 being keyed to the shaft 35, as indicated at 43. The other clutch member 42 has a sleeve portion 44 which constitutes an additional bearing for the shaft 35. A bevel gear 45 is shown integrally formed with the sleeve portion 44 of the clutch member 42, and meshes with bevel pinions 46 and 47, secured respectively to shafts 48 and 49 provided with hand wheels 51 and 52, respectively, as shown in Figure 8.

Each hand wheel 51 and 52 preferably has an operating crank 53 to facilitate rotating said wheels in the operation of manually raising or lowering the angle brackets 29 to which the punch holder is secured.

Figures 8, 9:
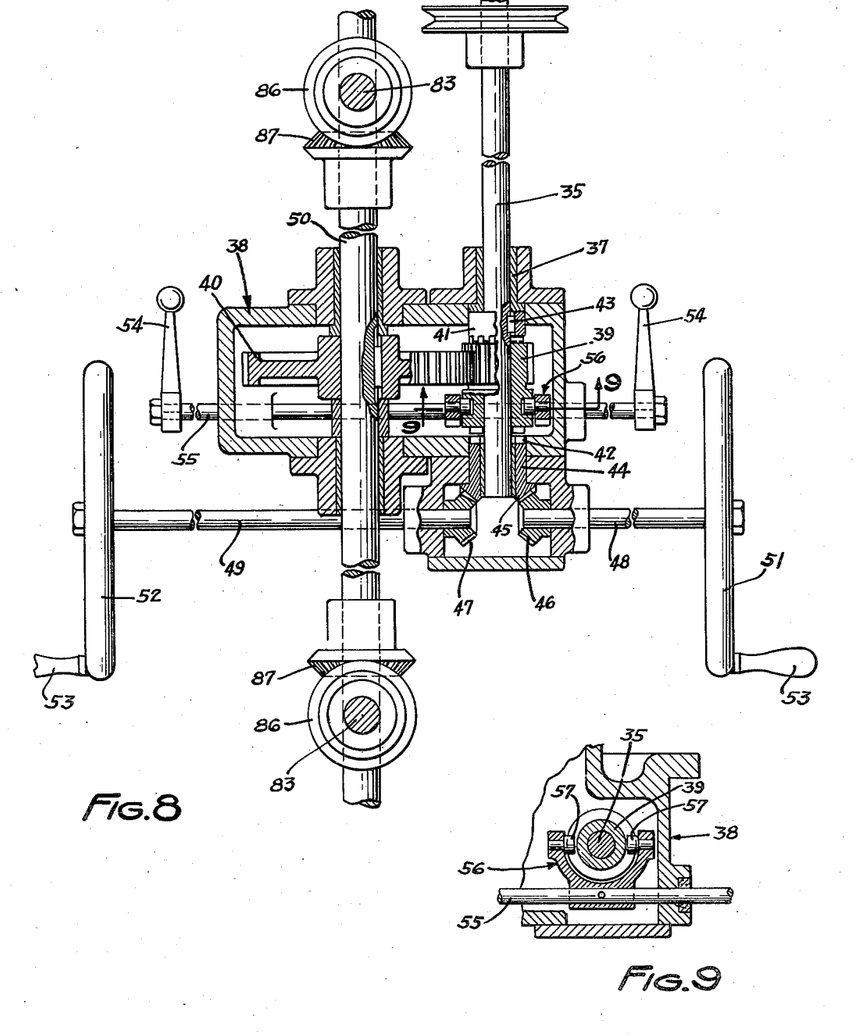
Figure 8 is a schematic view showing the various manual controls of the apparatus and also illustrating the drive mechanism for operating the various parts of the apparatus.
Figure 9 is a fragmentary detail sectional view on the line 9—9 of Figure 8.

The clutch pinion 39 meshes with a gear 40 keyed to a shaft 50, mounted in suitable bearings provided in the gear housing 38, as best shown in Figure 8. The pinion 39 is selectively movable into driving engagement with its complemental clutch members 41 and 42 by manipulation of one or the other of a pair of control levers 54, secured to a rock shaft 55 mounted in bearings provided in the housing 38, as will be understood by reference to Figure 8. A forked member 56 is secured to the shaft 55 and the spaced arms thereof are provided with inwardly facing elements 57 which are operatively engaged with the clutch pinion 39, as clearly illustrated in Figures 8 and 9. Manipulation of either of the control levers 54 will thus control the driving connection between the drive shaft 35 and the driven shaft 50 through the pinion 39 and gear 40, as clearly illustrated in Figure 8.

The horizontal shaft 50 is shown having its intermediate portion supported in suitable bearings provided in the housing 38. The opposite ends of said shaft may be supported in suitable bearings 70 and 80, indicated in dotted lines in Figure 1. The bearing 80 is shown in full lines in Figure 7. The shaft 50 is provided with a longitudinally extending spline, as shown in Figure 7, adapted to receive coacting splines or keys provided in the hubs of the pinions 87, whereby said pinions will be driven synchronously with the shaft 50. The hubs of the pinions 87 are shown rotatably supported in the bearings 70 and 80, and constitute the bearings for the ends of the shaft 50.

The pinions 87 mesh with similar pinions 86 secured to the lower ends of a pair of upright threaded shafts 83 having their lower ends mounted in suitable bearings provided in the lower portions of the columns 8 and 9, as illustrated in Figure 7. The upper ends of the threaded shafts 83 may be supported in suitable bearings 84 provided at the upper ends of the columns, as best indicated in Figure 4. The upright threaded shafts 83 are operatively connected to the carriages 31 whereby when the shafts 83 are relatively rotated, vertical movement is imparted to the carriages to thereby vary the spacing between the punch holder and die shoe, as will be understood by reference to Figure 1.

To operatively connect the carriages 31 to their respective upright threaded shafts 83, the inwardly projecting portion 30 of each carirage is provided with opposed bores 30' adapted to receive threaded elements 60, adjustably secured in said bores by suitable bolts or screws 60', as shown in Figure 10. The elements 60 are threaded to receive the upright shafts 83 and may be relatively adjusted with respect to one another by manipulation of the bolts or screws 60', thereby to eliminate excessive play between the carriages and upright shafts 83.

As hereinbefore stated, the up-and-down movement of the carriages 31 may be accomplished by manually rotating one or the other of the hand wheels 51 or 52, or by power, depending upon the position of the gear shift lever 54. This is a highly desirable feature because it makes it possible to quickly shift the angle brackets 29 from one elevation to another to facilitate periodic inspection of the work secured to the punch holder and die shoe without disrupting the settings of the punch holder and die shoe relative to each other.

The angle brackets 29, hereinbefore stated, are rotatably adjustable about horizontal axes by manipulation of a suitable hand wheel 58, shown secured to a shaft 59 mounted for rotation in a suitable bearing element 61 secured to the front wall of the column 9, as best shown in Figure 4. A pinion 62 is secured to the shaft 59 and meshes with a bevel gear 63 secured to an upright shaft 64 having a spline 65 therein. The lower end of the shaft 64 is shown mounted in a bearing 66 provided in the lower portion of the column 9, and the upper portion of the shaft 64 is supported in suitable bearings 67 and 68, shown integrally formed with a vertically movable gear housing 69.

A worm wheel 71 constantly meshes with a worm 72 non-rotatably but slidably engaged with the upright shaft 64. The gear housing 69 may be conveniently located within the column 9, and the worm gear 71 is suitably secured to a shaft 73 mounted in a suitable bearing provided in the carriage 31 of the pedestal 9, whereby when the hand wheel 58 at the front of the machine is rotated, rotary movement is imparted to the angle brackets 29 by relative rotation of their supporting carriages 31, as indicated by full and dotted lines in Figure 4.

Means is provided in conjunction with each carriage 31 for locking the angle brackets 29 in a selected position upon their respective carriages 31. Such means is best illustrated in Figures 5 and 6, and comprises suitable indexing bolts 74 slidably mounted in guides 75 secured to their respective carriages 31. The indexing bolts have tapered terminals adapted to be received in correspondingly shaped sockets 88 provided in the angle brackets 29, as shown in Figures 4, 5 and 6. The springs 76 constantly urge the indexing bolts 74 into locking engagement with the sockets 88 in the angle brackets, whereby when the bolts are released, the springs 76 will move them into locking engagement with their respective angle brackets 29.

The indexing bolts 74 have reduced shaft extensions 89 provided with rack teeth 91 adapted to be engaged by pinions 91a operatively connected to suitable hand wheels 91b, as will be understood by reference to Figures 5 and 6. The angle brackets, as best shown in Figure 5, are rotatable about the axes of the shafts 73. As shown in Figure 5, each shaft 73 has a head 77 received in recesses 78 provided in their complemental angle brackets 29, and are secured in said recesses by bolts 79. The opposite ends of the shafts 73 are suitably secured to the worm gears 71 by suitable keys 90 and end caps 81, secured to the ends of the shafts 73 by suitable cap screws 82.

Locking bolts 100 are shown provided in the hand wheels 91b having their terminals arranged to be received in sockets 91c and 91d provided in fixed portions 91e of the mounting means for the hand wheels 91b. The locking bolts serve to lock the index bolts or pins 74 in locking engagement with the angle brackets 29, or in positions to release the angle brackets, as will be understood by reference to Figures 5 and 6.

Another feature of the invention resides in the means provided between the carriages 31 and their respective operating shafts 83 whereby wear between the carriages and said shaft 83 may readily be taken up, when necessary.

Beveled pinions 86 are secured to the lower ends of the shafts 83, and mesh with bevel pinions 87, slidably engaged with the shaft 50, but non-rotatable with relation thereto. The pinions 87 are carried by their complemental columns 8 and 9 by the bearings 70 and 80, indicated in dotted lines in Figure 1 and shown in detail in Figure 7.

The shaft 35, as hereinbefore stated, is adapted to be rotated by manipulation of the hand wheels 51 or 52, as previously described with respect to Figure 8, whereby the carriages 31 are simultaneously vertically translated upon their respective columns 8 and 9. The carriages may also be vertically translated by the motor, when so desired, whereby when the carriages are located adjacent to their lower-most positions they may readily and quickly be elevated to their upper-most positions in a comparatively short time and without effort. A switch, generally designated by the letter S, is conveniently located beneath the bed plate 2, as shown in Figure 1, whereby an operator may readily start and stop the motor when necessary.

Another feature of the present invention resides in the provision of power means for drilling holes in the die parts while clamped or secured in the apparatus. As best illustrated in Figures 1 and 2, four upright posts 92, which preferably are cylindrical in cross section, are suitably secured to the ends of the bed plate 2. The posts 92 at each end of the bed plate have secured to their upper ends suitable tracks 93 disposed transversely of the bed plate, as best illustrated in Figure 2. The right hand side of the machine, when viewed as shown in Figure 2, is preferably considered the front or operator's side, although it is to be understood that the operator may also work from the other side of the machine if he so chooses.

Mounted upon the tracks 93 is a cross head 94 which extends the length of the machine, as best illustrated in Figure 1. The cross head is of more or less conventional construction and it is therefore believed unnecessary to herein describe the same in detail. Briefly, it comprises an elongated frame of angular cross section, as illustrated in Figure 2, provided at its opposite ends with suitable carrying rollers 95 and 96 adapted to roll upon the tracks 93, as will be understood by the full and dotted lines in Figure 2. The rollers 95 at each end of the machine are fixed to a shaft 97 extending the length of the cross head, and in like manner the rollers 96 may be secured to a similar shaft 98. By thus securing the rollers 95 and 96 to their respective shafts, the cross head 94 will always be maintained in parallel relation to the bed plate 2, regardless of its fore-and-aft movement on the tracks 93, as is well known.

A shaft 99 extends lengthwise through the cross head 94 and is shown operatively connected to an electric motor 101 through a variable speed belt drive 102. A drill head, generally designated by the numeral 103, is mounted for longitudinal travelling movement upon the cross head 94, and has a spindle 104 provided with a conventional chuck 105 for securing a drill to the spindle 104, as is well known.

The drill head is provided with the usual controls, such as a hand wheel 106, which, when rotated in one direction, will lock the drill head 103 in fixed position upon the cross head 94, necessary during each drilling operation. The drill head is also shown provided with a control wheel or knob 107 which controls the fore-and-aft movement of the cross head 94 upon the tracks 93. The spindle 104 and chuck 105 of the drill head may be manually raised and lowered by manipulation of an operating handle 108 which, like the controls 106 and 107, is conveniently located at the front side of the machine whereby the operator may conveniently manipulate such controls during the operation of the machine. The motor 101 is provided with an independent switch, not shown in the drawings. The shaft 99 is shown provided at the opposite end of the cross head with an extension 109 adapted to receive a suitable crank or hand wheel whereby the shaft may be manually rotated to rotate the spindle 104, when necessary.

The novel apparatus herein disclosed has proven to be a great time saver in that the operation of making a set of dies may be accomplished in a fraction of the time heretofore required for making such dies on a work bench in the usual manner. As indicated in Figure 1, the parts of the die set, including the die shoe 26 and punch holder 28, are secured respectively to the parallel bars 22 and the angle brackets 29, in accurate relation to one another, and the parts of the die are then secured to the die shoe and punch holder, whereby the work required to finish the die parts may be conveniently and expeditiously accomplished, oftentimes without removing the die parts from the punch holder and die shoe until the die has been completely finished. This is a highly desirable feature in that it assures the mechanic that the parts of the die will accurately fit each other when the die has been completed.

By reference to Figures 1 and 2, it will be noted that the parallel bars 22 are made comparatively high, whereby the die shoe supported thereon will be spaced upwardly from the top face 5 of the bed plate 2, a distance sufficient to permit a mechanic to insert bolts through the die shoe from the bottom thereof, or to perform other operations from under the die shoe. Such upward spacing of the die shoe also permits an electric light bulb to be placed on the top surface 5 of the bed plate 2 directly under the die shoe, thereby to illuminate the under side of the die shoe and also to facilitate making inspections of the interfitting of the parts of the dies secured to the die shoe and punch holder, when said parts are brought into interfitting engagement with one another.

The parallel bars 22, as hereinbefore stated, are readily adjustable longitudinally of the bed plate 2 by manipulation of the bolts or screws 24, after which the parallel bars may be manually slid along the bed plate towards or away from one another to position them in accordance with the particular size of the die set to be used for a given size die.

Die sets are well known in the trade, and are furnished in a multitude of sizes, depending upon the type and size of die to be constructed. It is therefore of utmost importance in a machine of this type that the means for supporting the die shoe be so constructed and arranged that any desired size and type of die shoe may be supported therein. The unique arrangement and mounting of the parallel bars embodied in the present invention makes it possible to support any particular size or type of die shoe in the machine, within its limits, in such a manner that operations may readily and conveniently be performed on a die part secured to the die shoe.

Figure 3:
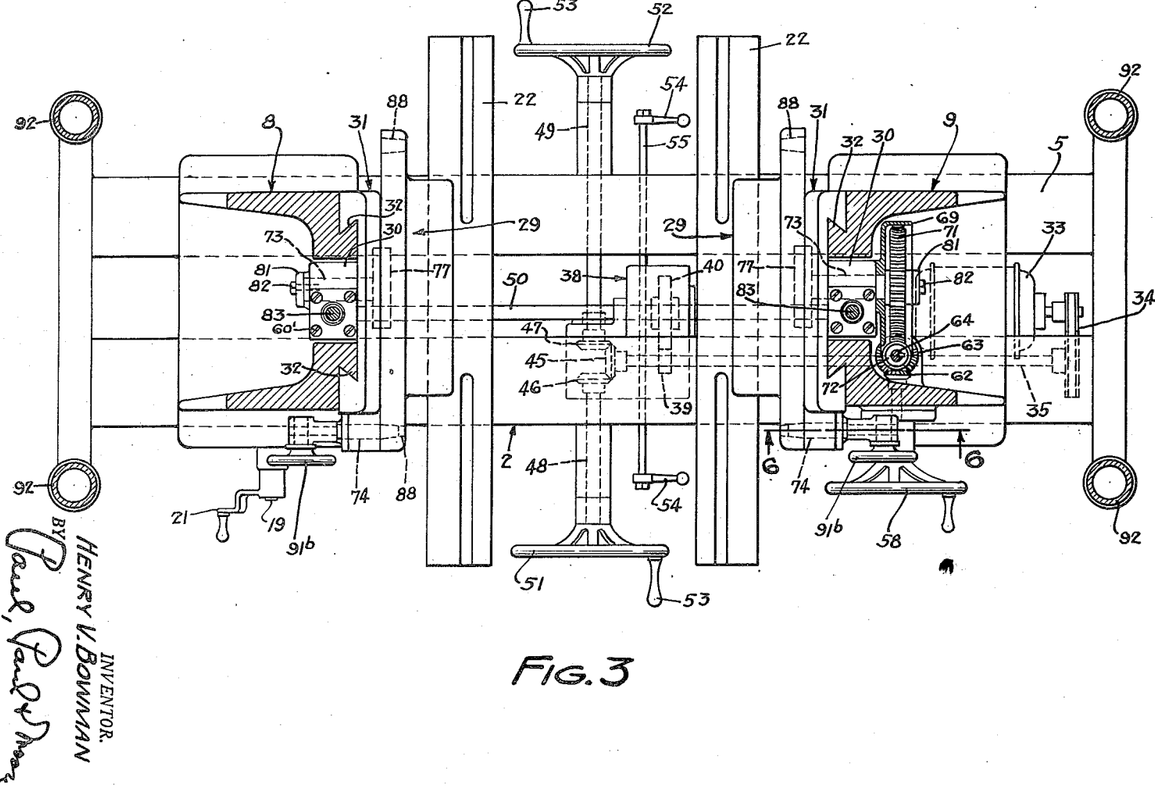
Figure 3 is a sectional plan view substantially on the line 3—3 of Figure 2, showing the guideways on the columns for guiding the angle bracket carriages in their up and down movements.

Of similar importance is the unique mounting of the punch holder 28 which, as hereinbefore described, is so arranged that it may be quickly moved up and down with relation to the die shoe in a given path, and whereby the dowels 100 secured to the die shoe will always accurately register with their complemental bores 100' provided in the punch holder, as will readily be understood by reference to Figure 1. In other words, the carriages 31 upon which the angle brackets 29 are mounted are simultaneously movable in their guides 32 by manipulation of one or the other of the hand wheels 51 or 52, through the gears 39 and 40 and pinions 86 and 87, as will be understood by reference to Figures 4 and 3. The operating means for the carriages 31 is so constructed that there can be no possible relative slippage between the two carriages. The punch holder therefore is moved into engagement with the dowel pins 100 of the die shoe with a precision fit, each time the punch holder is moved into its operative position with respect to the die shoe, so that the mechanic may move the parts of the die into and out of engagement with one another whenever desired to inspect the fit between such parts with the assurance that the movement of the punch holder into and out of engagement with the die shoe will always be accurate.

In addition, the pivotal mounting of the angle brackets 29 about the axes of the stub shafts 73 makes it possible to rotatably adjust the dies secured to the punch holder to any desired position within a 360° circle. It will also be noted that the horizontal portions of the brackets 29 are disposed in offset relation to the aligned axes of the stub shafts 73, whereby the punch holder will be offset from said axes so that when a die is secured to the punch holder in the usual manner, the combined weights of the punch holder and the die may be somewhat balanced about the aligned axes of the stub shafts 73, thereby to facilitate conveniently rotating the die and punch holder about said axes.

It will also be noted that with the novel die making machine herein disclosed, when the parts of a die have been partially completed or "roughed in," they may be secured to the die shoe and punch holder 26 and 28, respectively, after which the die parts may be conveniently manipulated in the machine to facilitate performing additional work operations thereon, if necessary, or to obtain the desired and accurate fits between the parts of the die. In most cases, all such finishing operations and final inspections of the parts of the die may be accomplished with the parts of the die secured respectively to the die shoe and punch holder, until the die has been completely finished, which makes it possible to complete the formation of a die in considerably less time than has heretofore been possible under conventional methods, and always with the assurance that the parts of the die will accurately fit one another when completed, provided, of course, that the mechanic has not erred in his work.

The columns 8 and 9 are mounted for travelling movement upon the bed plate 2 of the machine by manipulation of a suitable crank 21 which is detachably connected to one or the other of the squared extensions 19 of the shafts 16 to which the rack pinions 17 are secured. The up-and-down travel of the carriages 31 upon which the angle brackets 29 are mounted, may be performed by power by manipulation of the switch S which controls the operation of the motor 33; and, if desired, the punch holder may be manually raised or lowered by manipulation of one or the other of the hand wheels 51 or 52, as hereinbefore stated and as will be understood by reference to Figures 1, 2 and 4.

The hand wheel 58, located at the front side of the machine, provides means for readily and conveniently tilting the angle brackets 29 about their horizontal axes, whereby the die secured thereto may readily and quickly be turned to face forwardly or upwardly to facilitate making additional work operations thereon, or to inspect the die, as will be understood.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In a machine for facilitating the construction of dies, a bed plate, parallel bars adjustably secured to the bed plate for securing a die shoe in position thereon, opposed columns longitudinally movable on the bed plate, horizontally aligned trunnions in said columns for supporting a punch holder over the die shoe, and whereby the punch holder may be conveniently rotated about a horizontal axis to facilitate securing a die part thereto, and whereby the die part may be conveniently worked upon or inspected by an operator, and power means for vertically translating said trunnions on the columns whereby the punch holder may readily be moved into or out of accurate operative engagement with the die shoe, thereby to facilitate completing the formation of the die parts secured to the punch holder and die shoe, respectively.

2. In a machine for facilitating the construction of dies, a bed plate, parallel bars adjustably secured to the bed plate and adapted to support a die shoe, opposed columns longitudinally movable on the bed plate, horizontally aligned trunnions in said columns for adjustably supporting a punch holder over the die shoe and whereby the punch holder may be conveniently rotated about a horizontal axis to facilitate securing a die part thereto, and whereby the die part may be conveniently worked upon or inspected by an operator stationed before the machine, and power means for vertically translating said trunnions on the columns whereby the punch holder may readily and quickly be moved into or out of registry with the die holder in the course of completing the formation of a set of die parts.

3. In a machine for facilitating the construction of dies, a bed plate provided with longitudinally extending opposed guides, parallel bars secured to said guides and longitudinally adjustable thereon to accommodate die shoes of various sizes, a pair of upright columns mounted on the bed plate and longitudinally adjustable thereon, opposite guide flanges on the bed plate for retaining said columns in true parallel relation at all times, horizontally aligned trunnions mounted in said columns and provided with opposed angle brackets for supporting a punch holder in operative position over a die shoe secured to the parallel bars, means for simultaneously vertically translating the trunnions on the columns to move the punch holder into or out of registry with the die shoe, an overhead support for adjustably supporting a drill head over the punch holder whereby additional holes may be drilled in the punch holder or in a die part secured thereto, when necessary, without removing the punch holder or die part from the machine.

4. In a machine for facilitating the construction of dies, a bed plate provided with longitudinally extending opposed guides, parallel bars adjustably secured to said guides for supporting a die set thereon, said parallel bars having their upper faces spaced upwardly from the bed plate to provide a work space under a die shoe secured to said parallel bars, thereby to facilitate the performance of work operations on the die shoe or for inspection purposes, a pair of upright columns mounted on the bed plate and longitudinally adjustable thereon, horizontally aligned trunnions mounted in said columns and provided with opposed angle brackets cooperable to support a punch holder in operative relation to the die shoe secured to the parallel bars, power means for vertically translating the trunnions to move the punch holder into or out of operative engagement with the die shoe, and means whereby a drill head may be mounted over the punch holder to facilitate the drilling of additional holes in the punch holder or in a die secured thereto without removing the punch holder or die from the machine.

5. In a machine for facilitating the construction of large heavy die sets, the combination of an elongated bed plate, a pair of transversely disposed parallel bars adjustably secured to the bed plate for varying the spacing between said bars to adapt the machine for die sets of varying sizes, a pair of upright columns, gear means for longitudinally moving said columns on the bed plate to vary the spacing therebetween in accordance with the length of the die set to be made, a trunnion mounted in each of said columns and each comprising a bracket, said brackets having horizontally disposed seats cooperating to detachably support a punch holder, power means for vertically translating said trunnions on the columns whereby a punch holder secured to said brackets may conveniently be moved into or out of operative engagement with a die shoe secured to said parallel bars, thereby to facilitate the performance of work operations upon die parts secured to the punch holder and die shoe, and overhead support, a drill head movably mounted on said support whereby it may be moved to any desired position over the punch holder or a die part secured thereto to permit the drilling of additional holes in the punch holder or die part without disturbing the setting of the punch holder on said brackets nor the position of the die part secured thereto.

6. In a machine for facilitating the construction of large die sets, the combination of an elongated bed plate having longitudinally extending opposed guides thereon, a pair of transversely disposed parallel bars adjustably secured to said guides to vary the spacing between said bars to adapt the machine for die sets of varying sizes, a pair of upright columns movably supported on the bed plate and having gear means for longitudinally moving them on the bed plate to vary the spacing therebetween in accordance with the die set to be made, horizontally aligned trunnions secured in said columns and each having an angle bracket adjustably secured thereto, said angle brackets providing enlarged seats for supporting a punch holder, means for rotating said trunnions whereby the punch holder may be rotatively adjusted about the axes of said trunnions, power means for vertically translating said trunnions on the columns whereby a die shoe secured thereto may conveniently be moved into or out of operative engagement with a die shoe secured to said parallel bars, thereby to facilitate the performance of work operations upon die parts secured to the punch holder and die shoe, and a drill head mounted for universal movement over the punch holder to permit the drilling of additional holes in the punch holder or die part secured thereto without requiring the removal of said parts from the machine.

7. In a machine for facilitating the construction of large die sets, the combination of a bed plate having longitudinally extending opposed guides thereon, a pair of transversely disposed parallel bars adjustably secured to said guides whereby the spacing between said bars may be varied to adapt the machine for die sets of varying sizes, a pair of upright columns movably supported on the bed plate and having toothed means for longitudinally moving them on the bed plate to vary the spacing therebetween in accordance with the length of the die set to be made, horizontally aligned trunnions mounted in said columns and rotatably adjustable therein, an angle bracket mounted on each trunnion and each having a seat on which means for detachably securing a punch holder may be secured, said trunnions permitting the punch to be rotatively adjusted upon said columns power means for vertically translating said trunnions on the columns whereby a punch holder secured thereto may be conveniently moved into or out of operative engagement with a die shoe secured to said parallel bars, thereby, to facilitate the performance of work operations upon a die part secured to the punch holder, a pair of transversely disposed overhead tracks at the ends of the machine, carriages mounted for traveling movement on said tracks and cooperating to support a longitudinally extending frame having its ends secured to said carriages, a drill head mounted for longitudinal traveling movement on said longitudinally extending frame, the longitudinal movement of the drill head on said frame and the fore-and-aft movement of said frame combining to permit the drill head to be maneuvered into any desired position over the punch holder or a die part secured thereto to permit the drilling of additional holes in the punch holder or said die part without requiring removal of the punch holder or die part from the machine for such drilling, and a plurality of manual controls conveniently located on the machine whereby an operator stationed at the front thereof may readily and quickly shift the parts from one position to another to facilitate the performance of work operations on the die parts or the inspection of work operations performed thereon.

HENRY V. BOWMAN.

REFERENCES CITED

The following references are of record in the file of this patent:

UNITED STATES PATENTS

| Number | Name | Date |
|---|---|---|
| 1,034,150 | Silberman | July 30, 1912 |
| 1,323,267 | Hanson | Dec. 2, 1919 |
| 1,567,766 | Stacy | Dec. 29, 1925 |
| 1,645,906 | Hansen | Oct. 18, 1927 |
| 2,334,127 | Ringzelli | Nov. 9, 1943 |
| 2,393,696 | Kraut et al. | Jan. 29, 1946 |
| 2,475,692 | Borzym | July 12, 1949 |
| 2,475,693 | Borzym | July 12, 1949 |